(12) United States Patent
Lukic et al.

(10) Patent No.: US 7,859,202 B2
(45) Date of Patent: Dec. 28, 2010

(54) POWER MANAGEMENT FOR MULTI-MODULE ENERGY STORAGE SYSTEMS IN ELECTRIC, HYBRID ELECTRIC, AND FUEL CELL VEHICLES

(75) Inventors: Srdjan Lukic, Chicago, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 200 days.

(21) Appl. No.: 11/977,118

(22) Filed: Oct. 23, 2007

(65) Prior Publication Data
US 2008/0218104 A1    Sep. 11, 2008

Related U.S. Application Data

(60) Provisional application No. 60/906,039, filed on Mar. 9, 2007, provisional application No. 60/967,683, filed on Sep. 6, 2007.

(51) Int. Cl.
*H02P 3/00* (2006.01)
(52) U.S. Cl. .................. 318/139; 363/71; 180/65.2
(58) Field of Classification Search .......... 318/139; 363/71, 123; 180/65.2, 65.3
See application file for complete search history.

(56) References Cited

U.S. PATENT DOCUMENTS

| | | | |
|---|---|---|---|
| 4,348,628 A * | 9/1982 | Loucks | 320/124 |
| 5,710,699 A * | 1/1998 | King et al. | 363/132 |
| 6,265,851 B1 * | 7/2001 | Brien et al. | 320/162 |
| 6,429,613 B2 * | 8/2002 | Yanase et al. | 318/139 |
| 6,608,396 B2 * | 8/2003 | Downer et al. | 290/40 C |
| 6,737,822 B2 * | 5/2004 | King | 318/375 |
| 7,024,859 B2 | 4/2006 | Jayabalan et al. | |
| 7,193,385 B2 | 3/2007 | Emadi et al. | |
| 2009/0009113 A1 | 1/2009 | Rodriguez et al. | |
| 2009/0103341 A1 | 4/2009 | Lee et al. | |

OTHER PUBLICATIONS

John Miller et al., "Ultra-Capacitor Assisted Electric Drives for Transportation," International Electric Machines and Drives Conference, Madison, Wisconsin, Jun. 1-4, 2003, pp. 670-676.

John Miller et al., "An Assessment of Ultra-capacitors as the Power Cache in Toyota THS-II, GM-Allison AHS-2 and Ford FHS Hybrid Propulsion Systems," Applied Power Elect. Conf. and Expo, APEC 2005, vol. 1, pp. 481-490.

Andrew C. Baisden et al., "ADVISOR—Based Model of a Battery and an Ultra-Capacitor Energy Source for Hybrid Electric Vehicles," IEEE Transactions on Vehicular Technology, vol. 53, No. 1, Jan. 2004, pp. 199-205.

John Dispennette, "Ultracapacitors Bring Portability to Power," Power Electronics Technology, Oct. 2005, pp. 33-37.

(Continued)

*Primary Examiner*—Rina I Duda
(74) *Attorney, Agent, or Firm*—Pauley Petersen & Erickson

(57) ABSTRACT

An electric energy storage system (EESS) for providing a power management solution for a multi-subsystem energy storage in electric, hybrid electric, and fuel cell vehicles. The EESS has a controller that determines when to draw power from each subsystem as needed by the vehicle.

12 Claims, 6 Drawing Sheets

OTHER PUBLICATIONS

Srdjan Lukic et al., "Power Management of an Ultracapacitor/Battery Hybrid Energy Storage System in an HEV," IEEE Vehicle Power Propulsion Conference, Sep. 6-8, 2006.

Roberto M. Schupbach et al., "The Role of Ultracapacitors in an Energy Storage Unit for Vehicle Power Management," IEEE Conference, 2003, 5 pages.

Srdjan Lukic et al., "Power Management of an ultracapacitor /Battery Hybrid Energy Storage System in an HEV," PowerPoint Presentation, IEEE Vehicle Power Propulsion Conference, Sep. 6-8, 2006.

Co-Pending Patent Application U.S. Appl. No. 12/025,376, "Adaptive Control Strategy and Method Optimizing Hybrid Electric Vehicles," filing date Feb. 4, 2008.

* cited by examiner

POWER MANAGEMENT FOR MULTI-MODULE ENERGY STORAGE SYSTEMS IN ELECTRIC, HYBRID ELECTRIC, AND FUEL CELL VEHICLES

CROSS-REFERENCE TO RELATED APPLICATIONS

This application claims the benefit of Provisional U.S. Patent Application Ser. No. 60/906,039, filed on 9 Mar. 2007 and Provisional U.S. Patent Application Ser. No. 60/967,683, filed on 6 Sep. 2007. The co-pending Provisional Patent Applications are hereby incorporated by reference herein in its entirety and is made a part hereof, including but not limited to those portions which specifically appear hereinafter.

BACKGROUND OF THE INVENTION

1. Field of the Invention

The present invention relates generally to power management in vehicles. The present invention relates more specifically to the control of an electric energy storage apparatus for electric, hybrid electric, and fuel cell vehicles.

2. Discussion of the Related Art

In recent years, environmental concerns and foreign oil dependency have increased our nation's interest in a viable alternative to standard internal combustion engines. Some promising alternatives include electric, hybrid electric and fuel cell vehicles. However, each of these systems is limited by the power supply that supplies power to the electric motor/generator. The following discussions are directed to hybrid electric vehicles, but one skilled in the art would recognize that this invention is also applicable in other electric vehicles, e.g., pure electric vehicles and fuel cells.

Hybrid electric vehicles (HEV) couple the power produced by an internal combustion engine (ICE) and an electric motor to propel the vehicle more efficiently than the ICE by itself. Fuel economy improvement is generally obtained by using a smaller ICE (set to provide the average vehicle power demand), augmented by the electric motor (provides power demand transients). The electric motor is powered by an energy source such a battery or an ultracapacitor. The energy source needs to store adequate energy to meet the averaged demand that is required from the electric motor under various driving conditions. In addition to the energy requirement, the source needs to be able to deliver short high-power charge and discharge pulses.

In principle, batteries have a relatively high energy density. However, they do not posses instantaneous charge and discharge capabilities. Further, if batteries are cycled at very high C-rates, the life of the pack is severely diminished, and may also lead to safety issues due to thermal runaway. Therefore, the battery packs in HEV's generally have to be oversized to ensure battery life and to avoid thermal runaway.

Due to their high specific power and near instantaneous charge and discharge capabilities, ultracapacitors have been considered for transient power supply and recovery in hybrid power trains. Therefore, an energy storage system which utilizes both a battery and an ultracapacitor can reduce the strain on the battery pack. The ultracapacitor absorbs and supplies the large current pulses, and the battery provides the average power demand. This, in turn, allows for the size of the battery pack to be reduced, and sized for the energy requirement of the cycle, rather than the power requirement.

Prior designs of the energy storage systems have various limitations. FIG. 1 shows an energy storage system with a direct parallel connection of the two sources. The energy storage system with the direct parallel connection of the two sources shows a battery 10 in parallel with an ultracapacitor 12 and connected to a buck-boost converter 14. And the output of the buck-boost converter 14 is connected to a controller 16. The controller 16 is connected to an electric motor/generator 18. This setup generally keeps the same voltage over both the battery 10 and the ultracapacitor 12, which in turn limits the power delivered form the ultracapacitor 12.

FIG. 2 shows a prior design of an energy storage system with a bi-directional DC/DC converter. A first buck-boost converter 22 placed between a battery 20 and an ultracapacitor 24. And a second buck-boost converter 26 placed between the ultracapacitor 24 and a controller 28 which is connected to an electric motor/generator 30. The output of the first buck-boost converter 22 is current controlled, and controls the current output out of the battery 20. The ultracapacitor 24 supplies the remaining power requirement to an electric motor/generator 30. This allows for the battery 20 voltage to be different than that of the ultracapacitor 24. It is beneficial to put the battery 20 on the input side of the first buck-boost converter 22 to be able to control the current output, and therefore the stress on the battery 20. This makes the ultracapacitor's 24 voltage the voltage that is supplied to the electric motor (bus voltage). Therefore, the bus voltage varies with the state of charge (SoC) of the ultracapacitor 24. Since the voltage of the ultracapacitor 24 can vary substantially, there is a large voltage swing on the input to the second buck-boost converter 26. Therefore, the second buck-boost converter 26 has to be stable for a wide voltage input range. At low ultracapacitor 24 voltages, input current of the second buck boost converter 26 can be very high leading to large internal resistance losses and a need for high rating switches. As such, this system is relatively inefficient and costly.

Another potential limitation of many electric and hybrid vehicles is a common chemical reaction inside of batteries. This chemical reaction is sulfation of negative plates due to high power partial state of charge operation. This is primarily a problem for lead-acid batteries. However, the formation of large non-reactive sulfate crystals in the negative plate can be prevented by battery conditioning. Battery conditioning is a complete charge with a slight overcharge of the battery which breaks up sulfate crystals and allows capacity of the battery to be regained.

Prior battery management systems that have previously been considered as a solution to premature end of life due to sulfation in electric vehicle applications have numerous shortcomings. One prior approach takes a single cell of a module off-line and conditions this single cell while the other cells in the module supply the load. This is not very efficient since there is additional weight in the battery pack that is not being used to power the vehicle. Also, the system is made more complex since each battery requires additional switches for conditioning needs. Another approach conditions the batteries while the vehicle is not in use by redistributing the charge in the batteries to different battery modules, and thus conditions the batteries. However, this can only be done off-line, which assumes that the system is able to assess when the user is not using the vehicle, and finish the charge redistribution before the battery is to be used again. The third approach uses the electrical grid for lead acid battery conditioning. This requires an interface between the battery and the charger and in some cases a special outlet that is able to handle the high power requirements.

There is a need for an improved energy management system. There is a need for an energy management system that allows for use of an ultracapacitor and a battery. There is also a need for an energy management system that efficiently conditions batteries.

SUMMARY OF THE INVENTION

The present invention is provided to solve the problems discussed above and other problems, and to provide advantages and aspects not provided by prior power storage and management systems for electric vehicles.

The present invention provides a power management solution for electric energy storage system (EESS) in electric, hybrid electric, and fuel cell vehicles. The invention deals with the physical layout of the system as well as with control of the system.

The layout of EESS of the present invention includes at least two and desirably more than two power sources, i.e., two batteries, a battery and an ultracapacitor, two batteries and an ultracapacitor, etc. The power sources are electrically connected to the inputs of a multi-input, one-output bi-directional DC/DC converter. And, the output of the multi-input, one-output bi-directional DC/DC converter is connected to a controller which, in turn, is connected to an electric motor/generator which provides power to the vehicle. This layout provides a stable output of voltage and current from the multi-input, one-output bi-directional DC/DC converter.

This layout allows the controller to control each of the power sources separately. The advantage of this layout is that by separating the control of the two power supplies, there is an opportunity to optimize the performance of the system without adding substantially to the complexity of the system.

Other features and advantages of the invention will be apparent from the following description taken in conjunction with the following drawings.

DESCRIPTION OF THE PREFERRED EMBODIMENTS

Figure 1:
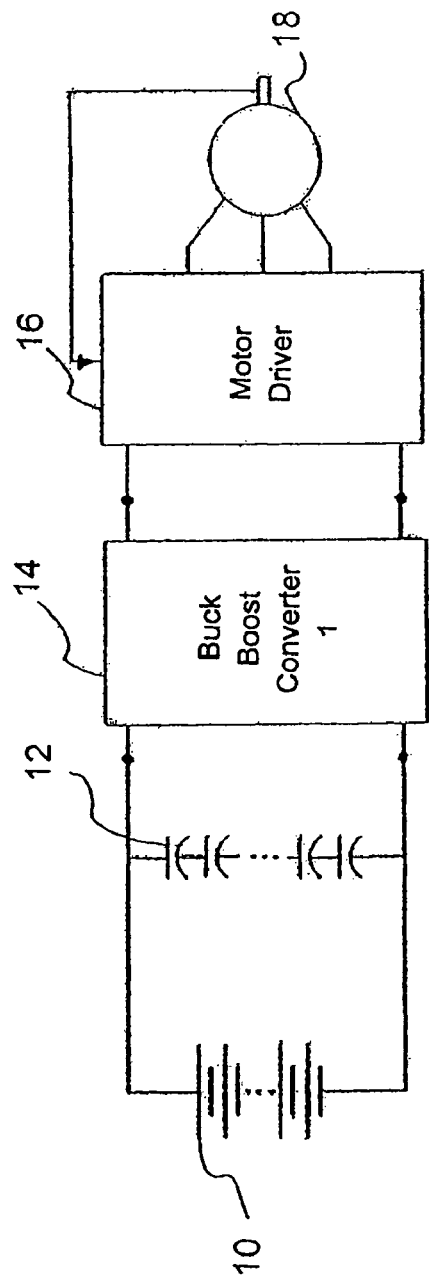
FIG. 1 is a diagram of a prior art energy storage system utilizing a battery and an ultracapacitor in parallel.
Figure 2:
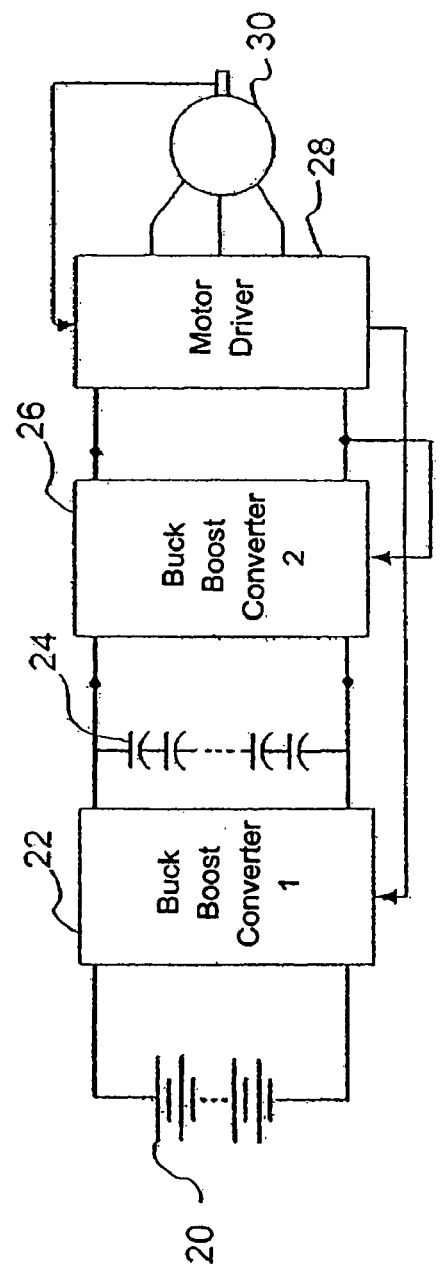
FIG. 2 is a diagram of a prior art energy storage system utilizing a bi-directional DC/DC converter along with a battery and an ultracapacitor.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 3:
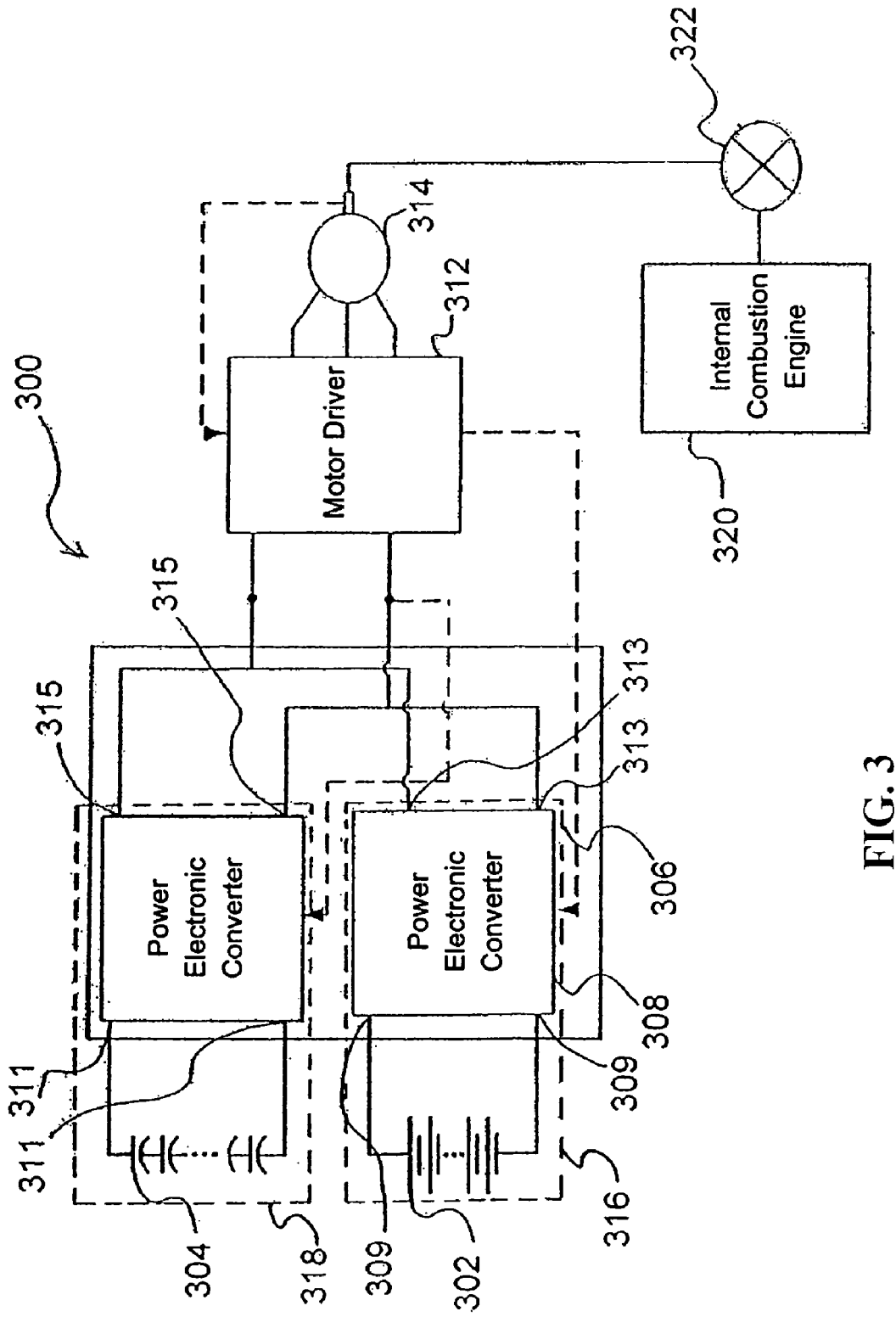
FIG. 3 is a diagram of an electric energy storage system utilizing a battery subsystem and an ultracapacitor subsystem, according to one embodiment of this invention.

FIG. 3 illustrates a diagram of a general circuit structure of an electrical energy storage system (EESS) 300 of one embodiment of this invention. The EESS 300 includes a first power source 302, a second power source 304, a two-input bi-directional DC/DC converter 306, a controller 312, an electric motor/generator 314, an internal combustion engine 320, and a drive shaft 322.

In the embodiment of FIG. 3, the first power source 302 is embodied as a battery or a string of batteries and the second power source 304 is embodied as an ultracapacitor or a string of capacitors. The battery 302 has multiple properties including: a minimum voltage; a maximum voltage; a voltage at a state of charge; and a resistance at a state of charge. The two-input bi-directional DC/DC converter 306 includes a first power electronic converter 308 and a second power electronic converter 310. The battery 302 and the first power electronic converter 308 form a battery subsystem 316. The ultracapacitor 304 and the second power electronic converter 310 form an ultracapacitor subsystem 318. Additionally, The controller comprises a data processor and software code on a recordable medium and executable by the data processor.

In the EESS 300, the battery 302 is electrically connected to a first input 309 of the two-input bi-directional DC/DC converter 306. As used herein "electrically connected" refers to a connection that allows a current to pass therethrough. The ultracapacitor 304 is electrically connected to a second input 311 of the two-input bi-directional DC/DC converter 306. The outputs 313, 315 of the first and second power electronic converters 308, 310, respectively, are electrically connected to form a single output of the two-input bi-directional DC/DC converter 306. The output of the two-input bi-directional DC/DC converter 306 is stable and is electrically connected to the controller 312. The controller 312 is electrically connected to the electric motor/generator 314. The controller 312 receives information from the battery subsystem 316, the ultracapacitor subsystem 318 and the electric motor/generator 314. And the electric motor/generator 314 and the internal combustion engine 320 are coupled with the driveshaft 322 to jointly or alternatively provide rotational motion to the driveshaft.

Figure 4:
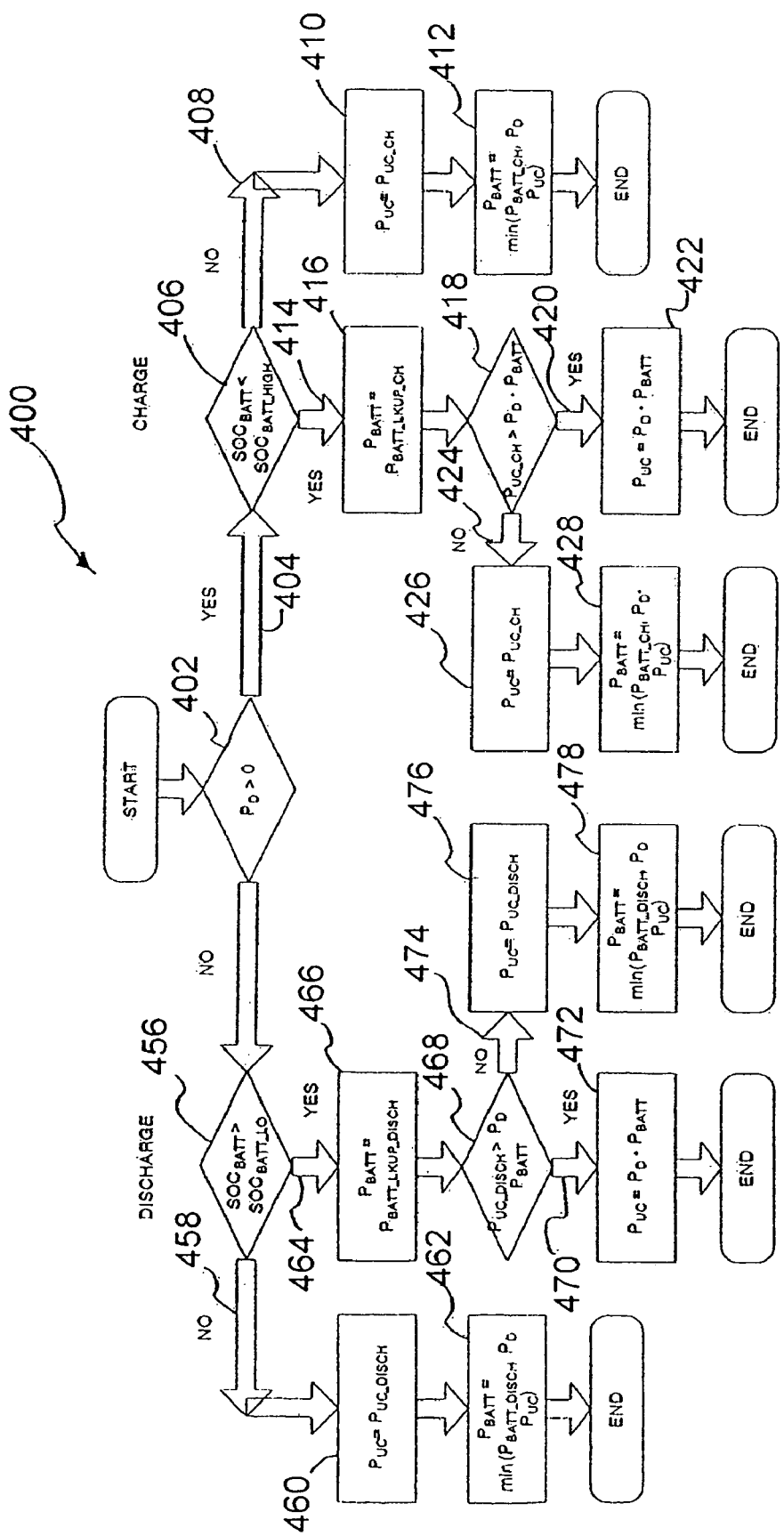
FIG. 4 is a flow chart for a control strategy for an electric energy storage system utilizing a battery subsystem and an ultracapacitor subsystem, according to one embodiment of this invention.

An exemplary operation of EESS 300 is represented in the flowchart 400 in FIG. 4, with reference to Table 1. Table 1 includes various parameters discussed in FIG. 4 that are entered into the controller 312.

TABLE 1

| Parameter | Description |
| --- | --- |
| $P_D$ | Power demand from the electric drivetrain (electric motor/generator) |
| $P_{UC}$ | Calculated power demand (discharge) or supply (charge) from the Ultracapacitor (UC) |

TABLE 1-continued

| Parameter | Description |
| --- | --- |
| $P_{BATT}$ | Calculated power demand (discharge) or supply (charge) from the battery |
| $SOC_{BATT}$ | Battery state of charge |
| $SOC_{UC}$ | UC state of charge |
| $P_{UC\_DISCH}$ | Power available from the UC. This is the power the UC can give to the electric drivetrain. This parameter is measured ahead of time and is stored in a lookup table. The available power is a function of the state of charge of the UC system. |
| $P_{UC\_CH}$ | Power which the UC can absorb. This is the power the UC can absorb from the electric drivetrain. This parameter is measured ahead of time and is stored in a lookup table. The available power is a function of the state of charge of the UC system. |
| $P_{BATT\_DISCH}$ | Power available from the battery. This is the power the battery can give to the electric drivetrain. This parameter is measured ahead of time and is stored in a lookup table. The available power is a function of the state of charge of the battery system. |
| $P_{BATT\_CH}$ | Power which the battery can absorb. This is the power the battery can absorb from the electric drivetrain. This parameter is measured ahead of time and is stored in a lookup table. The available power is a function of the state of charge of the battery system. |
| $SOC_{BATT\_LO}$ | Lowest state-of-charge of the battery allowed by the control strategy |
| $SOC_{BATT\_HIGH}$ | Highest state-of-charge of the battery allowed by the control strategy |
| $P_{BATT\_LKUP\_DISCH}$ | Lookup table prescribing the percentage of the total power demand which will be supplied by the battery system. In the simplest case this table is a function of the state of charge of the battery*. |
| $P_{BATT\_LKUP\_CH}$ | Lookup table prescribing the percentage of the total power demand which will be absorbed by the battery system. In the simplest case this table is a function of the state of charge of the battery*. |

*For a more intelligent design, this table will reference to many other parameters. These parameters include: the UC state of charge and the previous driving conditions. An example scenario is that of a vehicle which breaks to a stop (this would mean that the vehicle stopped at a traffic light or a stop sign). The lookup table would then choose the parameters which would ensure that the UC is charged so that the electric system can meet the coming power surge required when the vehicle accelerates from a stop. Note that the lookup table can be replaced by a neural network. A neural network would act just like the lookup table, but it would have the ability to generalize and interpolate from the data that it was trained on, as well as learn as it is being used (adaptive neural network).

As used herein a "parameter" refers to a defined value (or possibly a range of values) which are characteristics of the components, e.g., the type of battery or ultracapacitor, and criterion of the designer. These parameters are determined by considering a power management solution that a designer wants to achieve with the vehicle. The power management solution includes a primary objective that the EESS 300, as a whole, is able to provide a predefined maximum power that the electric motor/generator 314 unit may require. A second objective is then placed on the EESS 300 to optimize certain performance aspects. These performance aspects may include: to increase the life of the system, primarily concerning the batteries and typically lithium-ion or lead-acid batteries; to reduce the overall system cost; and reduce the weight or volume of the system, volume is generally an issue for ultracapacitors and weight is generally an issue for lead-acid batteries. Based on this objective, the lookup table (or the neural network—please note the starred section in table 1) for the battery system can be designed for both the charge ($P_{BAT\_LKUP\_CH}$) and discharge mode ($P_{BAT\_LKUP\_DISCH}$).

It should be noted that the parameters listed in Table 1 are not intended to be exhaustive and may include many more parameters depending on need and the overall storage-motor system, e.g., the state of charge of the ultracapacitor and parameters obtained based on previous driving conditions.

FIG. 4 will be described with reference to FIG. 3, but is not intended to be limited to only the particular embodiment of FIG. 3. The flowchart begins at diamond 402 where the controller 312 must first determine whether the electric motor/generator 314 is functioning as a motor or a generator. The electric motor/generator 314 is functioning as a generator when the power demand of the electric motor/generator 314 is greater than zero, shown as arrow 404 on the flowchart 400.

When the power demand is greater than zero, the battery 302 and the ultracapacitor 304 can be recharged. In diamond 406, the controller 312 is determining if the battery 302 needs to be recharged. The controller 312 first determines if the operating state of charge (SoC) of the battery 302 ($SOC_{BATT}$) is less than the highest SoC of the battery ($SOC_{BATT\_HIGH}$) allowed by a predetermined performance criterion. As used herein "SoC" refers to the level of charge of the battery (the energy remaining in the battery) in comparison to the maximum level of charge for the battery expressed in a percentage. If the SoC of the battery 302 ($SOC_{BATT}$) is not less than the highest allowed SoC of the battery ($SOC_{BATT\_HIGH}$), as shown by arrow 408, then the UC will absorb the maximum charge that it can. The maximum power that the UC 302 can absorb ($P_{CHARGE\ UC}$) is equal to the following equation:

$$P_{CHARGEUC}(SoC) = V_{MAX} \cdot \left( \frac{V_{MAX} - V_{OC}(SoC)}{\left( \frac{(V_{OCFINAL}(SoC) + IR_{OHMIC}) - V_{OCINITIAL}(SoC)}{I_{LOAD}} \right)(SoC)} \right)$$

Box 412 then defines the power which the battery will absorb as the smaller power of the two: the maximum that the battery can absorb ($P_{BATT\_CH}$) as defined by the equation below:

$$P_{CHARGE\,BATT}(SoC) = V_{MAX} \cdot \left(\frac{V_{MAX} - V_{OC}(SoC)}{R_{CHARGEBATT}(SoC)}\right).$$

or the difference between $P_D$ and the power absorbed by the UC.

If, however, the SoC of the battery 302 ($SOC_{BATT}$) is less than the highest SoC of the battery ($SOC_{BATT\_HIGH}$) as defined by the performance criterion, as shown by arrow 414 the battery 302 will absorb the power equal to the value stored in the controller 312 ($P_{BATT\_LKUP\_CH}$), as shown in box 416.

Then, in diamond 418, the controller 312 determines if the UC can absorb the remainder of $P_D$. If there is sufficient power, as shown in arrow 420, then the power the ultracapacitor 304 can absorb ($P_{UC}$) is equal to difference between the power generated by the electric motor/generator 314 ($P_D$) and the power absorbed by the battery ($P_{BATT}$) as shown in box 422. If there is not sufficient power, as shown by arrow 424, then the power absorbed by the ultracapacitor 304 ($P_{UC}$) is equal to the maximum power the ultracapacitor 304 can absorb as stored in the controller 312 ($P_{UC\_CH}$), as shown in box 426. And, as shown in box 428, the power that the battery 302 can absorb ($P_{BATT}$) is equal to the following equation:

$$P_{CHARGE\,BATT}(SoC) = V_{MAX} \cdot \left(\frac{V_{MAX} - V_{OC}(SoC)}{R_{CHARGEBATT}(SoC)}\right).$$

or the difference between the power demand and the power the UC has supplied, whichever is smaller.

When the power demand determined in diamond 402 is less than zero, the battery 302 and/or the ultracapacitor 304 must supply power to the electric motor/generator 314. In diamond 456, the controller 312 is determining if the battery 302 is able to supply the power to the electric motor/generator 314. The controller 312 first determines if the operating state of charge (SoC) of the battery 302 ($SOC_{BATT}$) is greater than the lowest SoC of the battery 302 ($SOC_{BATT\_LO}$) allowed by the predetermined performance criteria. If the SoC of the battery 302 ($SOC_{BATT}$) is not greater than the lowest allowed SoC of the battery ($SOC_{BATT\_LO}$), as shown in arrow 458, then the UC will supply the maximum charge that it can. The maximum power that the UC can supply is equal to the following equation:

$$P_{DISCHARGE\,UC}(SoC) = V_{MIN} \cdot \left(\frac{V_{OC}(SoC) - V_{MIN}}{\frac{V_{OC\,INITIAL}(SoC) - (V_{OC\,FINAL}(SoC) - IR_{OHMIC})}{I_{LOAD}}}\right)$$

Box 462 then defines the power which the battery 302 will provide as the smaller of the two: the minimum that the battery can provide ($P_{BATT}$) as defined by the equation below:

$$P_{DISCHARGE\,BATT}(SoC) = V_{MIN} \cdot \left(\frac{V_{OC}(SoC) - V_{MIN}}{R_{DISCHARGEBATT}(SoC)}\right)$$

or the difference between $P_D$ and the power supplied by the UC.

If, however, the SoC of the battery 302 ($SOC_{BATT}$) is greater than the lowest SoC of the battery ($SOC_{BATT\_LO}$) as defined by the performance criteria, as shown by arrow 464, the battery 302 will provide the power equal to the value stored in the controller 312 ($P_{BAT\_LKUP\_DISCH}$), as shown in box 466.

Then, in diamond 468, the controller 312 determines if the UC can supply the remainder of $P_D$. If the ultracapacitor 304 can supply the difference, as shown by arrow 470, then the power the ultracapacitor 304 supplies ($P_{UC}$) is equal to difference between the power demanded by the electric motor/generator 314 ($P_D$) and the power supplied by the battery 302 ($P_{BATT}$) as shown in box 472. If the ultracapacitor cannot supply the necessary difference, as shown by arrow 474, then the power supplied by the ultracapacitor ($P_{UC}$) is equal to the maximum power the ultracapacitor can supply as stored in the controller 312 ($P_{UC\_DISCH}$), as shown in box 476. And, the battery 302 makes up for the difference, as shown in box 478. The power that the battery 302 supplies ($P_{BATT}$) is equal to the following equation:

$$P_{DISCHARGE\,BATT}(SoC) = V_{MIN} \cdot \left(\frac{V_{OC}(SoC) - V_{MIN}}{R_{DISCHARGE\,BATT}(SoC)}\right).$$

or the difference between the power demand and the power supplied by the UC, whichever is smaller.

Figure 5:
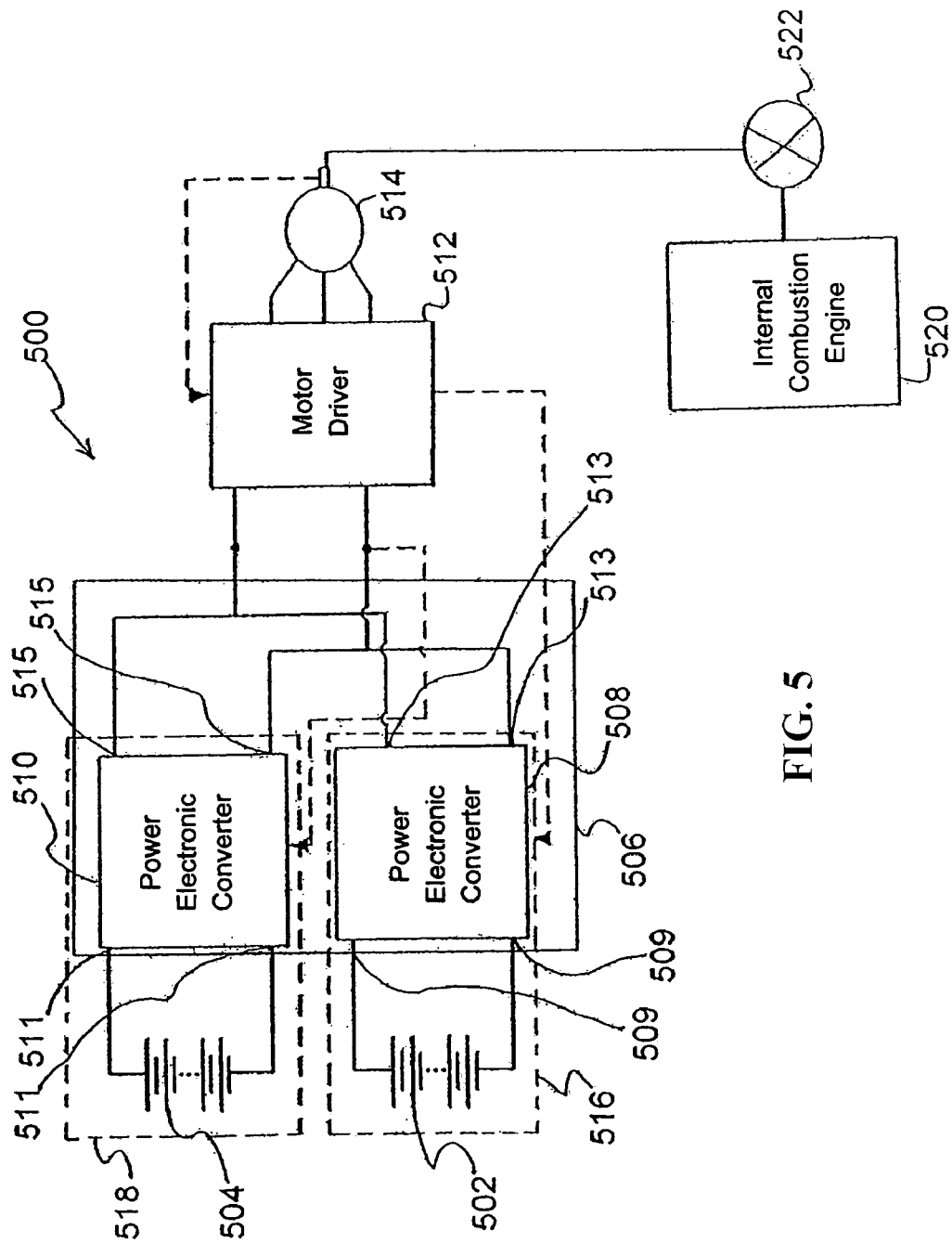
FIG. 5 is a diagram of an electric energy storage system utilizing a first battery subsystem and a second battery subsystem, according to another embodiment of this invention.

FIG. 5 illustrates a block diagram of a circuit structure of an Electrical Energy Storage System (EESS) 500 of another embodiment of this invention. This EESS 500 is particularly useful for conditioning batteries in an hybrid electric vehicle. The EESS 500 includes a first power source 502, a second power source 504, a two-input bi-directional DC/DC converter 506, a controller 512, an electric motor/generator 514, an internal combustion engine 520, and a drive shaft 522.

In this embodiment, the first power source 502 includes at least one first battery and the second power source 504 includes at least one second battery. Each of the first battery 502 and the second battery 504 has multiple properties including: a minimum voltage; a maximum voltage; a voltage at a state of charge; and a resistance at a state of charge. As discussed above, the first battery 502 can include one battery or more than one battery in series, and the second battery 504 can also include one battery or more than one battery in series. The two-input bi-directional DC/DC converter 506 includes a first power electronic converter 508 and a second power electronic converter 510. The first battery 502 and the first power electronic converter 508 form a first battery subsystem 516. The second battery 504 and the second power electronic converter 510 form a second battery subsystem 518.

In the EESS 500, the first battery 502 is electrically connected to a first input 509 of the two-input bi-directional DC/DC converter 506. The second battery 504 is electrically connected to a second input 511 of the two-input bi-directional DC/DC converter 506. An output 513, 515 of each of the power electronic converters 508, 510 is electrically connected to form a single output of the two-input bi-directional DC/DC converter 506. The output of the two-input bi-directional DC/DC converter 506 is electrically connected to the controller 512. The controller 512 is electrically connected to the electric motor/generator 514. The controller 512 receives information from the first battery subsystem 516, the second battery subsystem 518 and the electric motor/generator 514. And, the electric motor/generator 514 and the internal combustion engine 520 are coupled with the driveshaft 522 to jointly or alternatively provide rotational motion to the driveshaft.

In operation, the EESS 500 is desirably used to condition the batteries 502, 504 in order to improve battery life. This is particularly important for lead-acid batteries, to prevent a build-up of sulfate crystals on a negative plate of the batteries. As discussed above, the life of lead acid batteries in high-rate partial state-of-charge applications can be limited by the sulfation of the negative plate. Due to the fact that the battery is never fully charged in a hybrid electric vehicle application, the sulfate crystals grow. As the sulfate crystals grow larger, the effective reaction surface area reduces until the batteries are no longer able to provide enough power to meet the vehicle's requirements. However, the build-up of sulfate crystals can be suppressed by periodically recharging the battery to full capacity.

The system works by maintaining tight control of a state of charge for each battery 502, 504. The tight control of the SoC for each battery is achieved based on a management algorithm in the controller 512. Then, in operation, the electric motor/generator 514 will draw power which is ultimately drawn from the first battery 502, the second battery 504, or both. The controller 512 determines which battery 502, 504 will supply the power by first measuring the SoC for the first battery 502 and the second battery 504. And, which of the first and second battery 502, 504 will receive power in order to be recharged.

Figure 6:
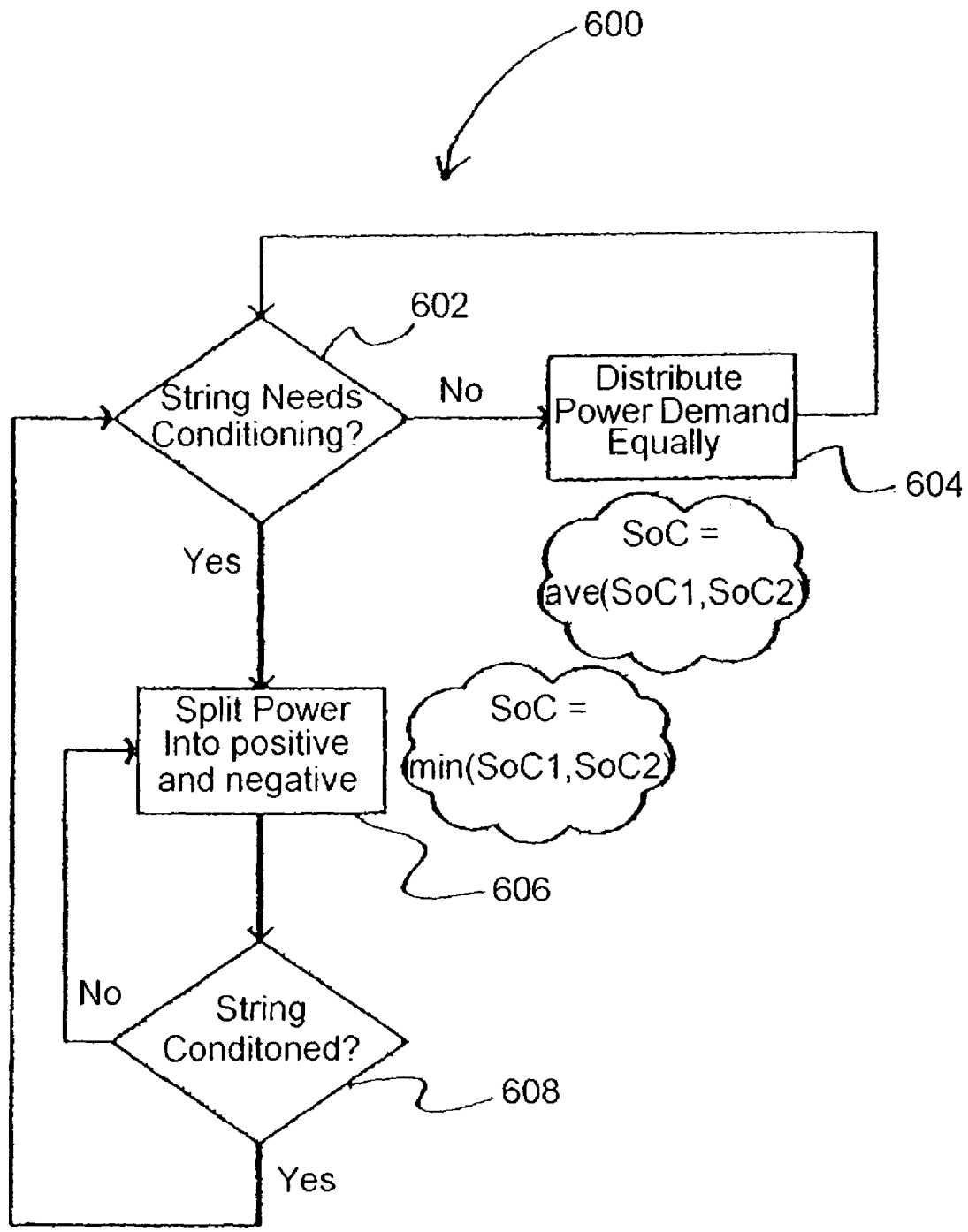
FIG. 6 is a flow chart for a control strategy for an electric energy storage system utilizing a first battery subsystem and a second battery subsystem, according to one embodiment of this invention.
Figure 7:
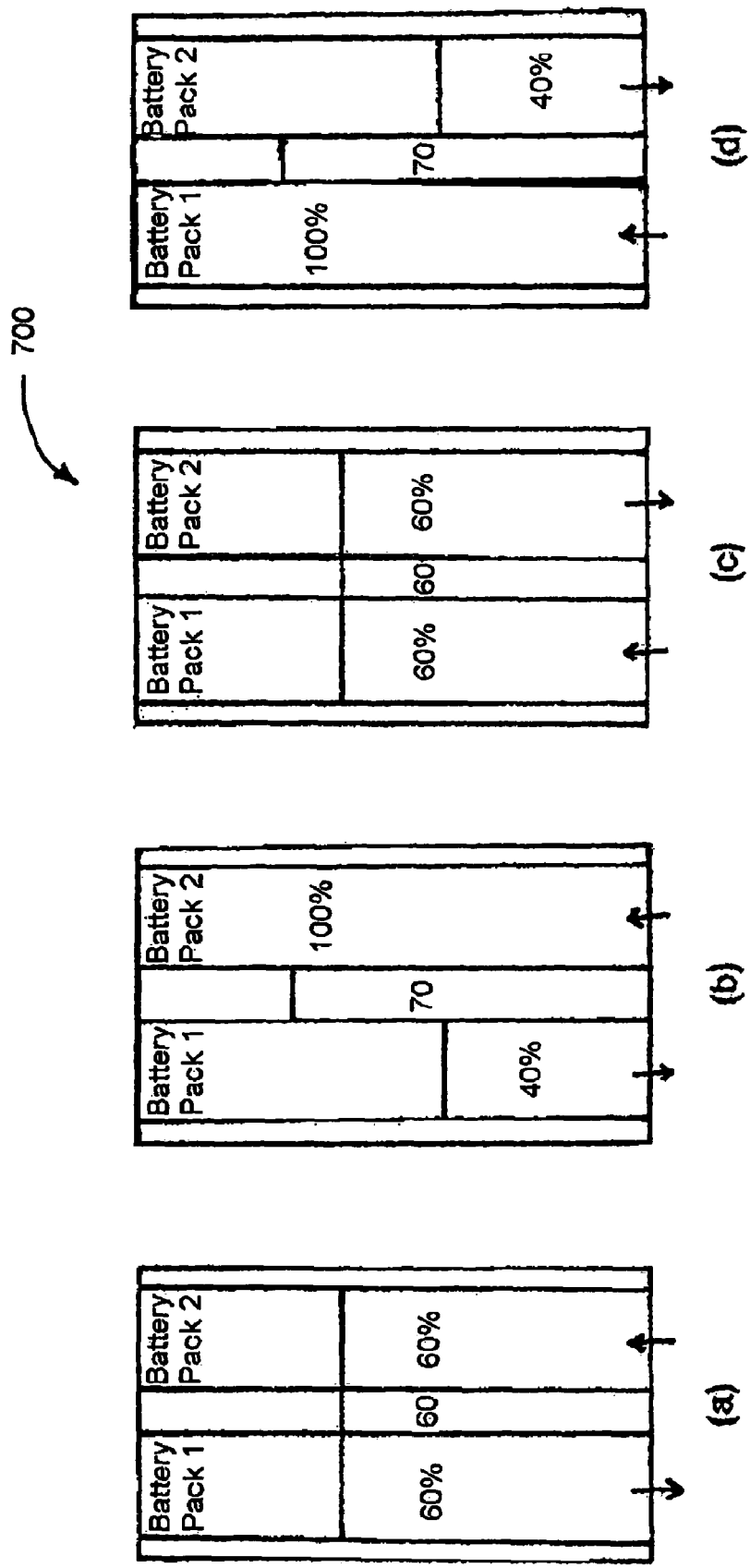
FIG. 7 is a pictorial representation of the state of charge of a first and a second battery for an electric energy storage system utilizing a first battery subsystem and a second battery subsystem, according to another embodiment of this invention.

An exemplary operation of EESS 500 is represented in the flowchart 600 of FIG. 6, and the representation 700 of a state of charge of the first and second batteries in FIG. 7. In FIG. 6, starting at diamond 602, the controller 512 first determines if one of the first battery 502 and the second battery 504 need conditioning, i.e. determining that the battery has sulfated. There are many ways to determine if the battery has sulfated such as by measuring the state of health of the battery or by determining if the SoC of the batteries 502, 504 is at or below a threshold state of charge. One simple approach is to condition the batteries 502, 504 according to a pre-determined schedule (e.g., each battery is conditioned every 2 months).

When a battery (say battery 502) requires conditioning, as shown by the arrow below diamond 602, then the controller 512 will split the power into positive and negative, the controller 512 will send all charging current to the first battery 502 and only draw current from the second battery 504 to the electric motor/generator 514 until the first battery 502 is charged up to a predetermined SoC. As will be appreciated by those skilled in the art, the charging current can be drawn from regenerative braking and opportunity charging from the electric motor/generator. "Opportunity charging" in an HEV occurs when it is efficient to draw power from the internal combustion engine to charge the batteries.

In another alternative embodiment, the embodiments in FIG. 3 and FIG. 5 can be combined to form a system which combines two batteries and an UC unit.

Thus the invention provides an efficient electric energy storage device with a stable output and a controller which is able to draw power from and supply power to each of the power supplies independently. Providing an opportunity to achieve performance objectives, such as: increasing the life of the system; reducing cost; and reducing the weight and volume of the system.

While certain exemplary embodiments have been put forth to illustrate the present invention, these embodiments are not to be taken as limiting to the spirit or scope of the present invention which is defined by the appended claims. For example, the two power sources in each embodiment may be expanded to three or more power sources and may include multiple batteries, multiple capacitors or any other power source.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for implementing an energy storage apparatus coupled with an electric motor/generator in a vehicle, the method comprising:
   electrically connecting a controller between at least one converter and the electric motor/generator, the at least one converter including a first converter input electrically connected to a battery and a second converter input electrically connected to an ultracapacitor;
   continually monitoring with the controller a state of charge of each of the battery and the ultracapacitor;
   storing as parameters the current state of charge of each of the battery and the ultracapacitor with the controller and updating the stored parameters as a function of the continual monitoring;
   monitoring with the controller a power demand of the electric motor/generator;
   comparing the power demand to the stored parameters and selecting a percentage of the power demand to be supplied by the battery as a function of the stored parameters;
   powering the electric motor/generator with the controller using electrical power from at least one of the battery or the ultracapacitor;
   determining with the controller a power absorption parameter of each of the battery and the ultracapacitor to determine a recharge requirement of each of the battery and the ultracapacitor;
   selecting with the controller at least one of the battery and the ultracapacitor for recharge; and
   recharging the at least one of the battery or the ultracapacitor with the controller using electrical power generated by the electric motor/generator.

2. The method according to claim 1, wherein the converter comprises a multi-input bi-directional DC/DC converter.

3. The method according to claim 1, wherein the power demand is determined according to at least one of the parameter, a driving cycle of the vehicle, and the operating state of charge of each of the battery and the ultracapacitor.

4. The method according to claim 1, wherein monitoring with the controller the operating state of charge of each of the battery and the ultracapacitor comprises determining if the operating state of charge of the battery or the ultracapacitor is below a predetermined maximum state of charge.

5. The method according to claim 1, wherein monitoring with the controller the operating state of charge of each of the battery and the ultracapacitor comprises determining if the operating state of charge of the battery or the ultracapacitor is above a predetermined minimum state of charge.

6. The method according to claim 1, wherein the vehicle comprises an internal combustion engine and a driveshaft, wherein the electric motor/generator and the internal combustion engine are coupled with the driveshaft to jointly or alternatively provide rotational motion to the driveshaft.

7. The method according to claim 1, wherein the power absorption parameters of each of the battery and the ultracapacitor are a function of the stored parameters of the current state of charge of each of the battery and the ultracapacitor.

8. The method according to claim 1, wherein as the vehicle brakes to a stop the controller adjusts the power absorption parameter of each of the battery and the ultracapacitor to ensure that the ultracapacitor is fully charged.

9. A method for implementing an energy storage apparatus coupled with an electric motor/generator in a vehicle, the method comprising:
electrically connecting a controller between at least one converter and the electric motor/generator, the at least one converter including a first converter input electrically connected to a first battery and a second converter input electrically connected to a second battery;
monitoring with the controller a power demand of the electric motor/generator;
monitoring with the controller an operating state of charge of each of the first battery and second battery;
powering the electric motor/generator with the controller using electrical power from at least one of the first battery and the second battery;
determining if the first battery needs conditioning; and
conditioning the first battery by sending all charging current from the electric motor/generator to the first battery and drawing power from the second battery to power the electric motor/generator, wherein conditioning the first battery includes charging to an over-charge to break-up sulfate crystals in the first battery.

10. The method according to claim 9, further comprising:
establishing a threshold state of charge for each of the first battery and the second battery;
monitoring with the controller an operating state of charge for each of the first battery and the second battery;
determining the operating state of charge of one of the first battery and the second battery is at or below the threshold state of charge; and
powering the electric motor/generator with an other of the one of the first battery and the second battery when the one of the first battery and the second battery is at or below the threshold state of charge.

11. The method according to claim 10, further comprising directing electrical power with the controller from the electric motor/generator to the one of the first battery and the second battery when the operating state of charge is at or below the threshold state of charge.

12. The method according to claim 9, further comprising directing electrical power with the controller from the electric motor/generator to one of the first battery and the second battery on a predetermined schedule and powering the electric motor/generator with an other of the first battery and the second battery.

* * * * *